(12) United States Patent
Anhorn

(10) Patent No.: US 6,469,981 B1
(45) Date of Patent: Oct. 22, 2002

(54) POINT-TO-MULTIPOINT NETWORK

(75) Inventor: Jürgen Anhorn, Kornwestheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/353,355

(22) Filed: Jul. 15, 1999

(30) Foreign Application Priority Data

Jul. 16, 1998 (DE) .......................................... 198 31 954

(51) Int. Cl.[7] .............................................. H04L 12/56
(52) U.S. Cl. ...................................... 370/217; 709/239
(58) Field of Search ................................ 370/217, 225, 370/226, 227, 228, 222, 223, 224; 709/239

(56) References Cited

U.S. PATENT DOCUMENTS

| | | | |
|---|---|---|---|
| 4,701,756 A | | 10/1987 | Burr |
| 5,307,353 A | * | 4/1994 | Yamashita et al. |
| 5,491,686 A | * | 2/1996 | Sato |
| 5,652,764 A | | 7/1997 | Kanzaki et al. |
| 6,269,452 B1 | * | 7/2001 | Daruwalla et al. ............. 714/4 |

FOREIGN PATENT DOCUMENTS

| | | |
|---|---|---|
| DE | 195 09 602 C1 | 5/1996 |
| DE | 195 11 250 A1 | 10/1996 |
| DE | 196 33 744 A1 | 2/1998 |
| EP | 0 396 084 A2 | 11/1990 |
| EP | 0 545 802 A1 | 6/1993 |
| EP | 0 847 160 A2 | 6/1998 |

OTHER PUBLICATIONS

F. Bran et al, SILK—Knozept und allgemeiner Aufbau. In: hasler–Mitteilungen, Nr. 1, 1981, S.3–6.

P. Benoit et al, A cross–connect System for digital data leased lines. In: Philips Telecommunication Review, vol. 49, No. 3, Sep. 1991, S.38–41.

"Telcom report" Siemens Telekommunikation AG, No. 3/1996, pp. 10–13.

* cited by examiner

*Primary Examiner*—Douglas Olms
*Assistant Examiner*—Ken Vanderpuye
(74) *Attorney, Agent, or Firm*—Sughrue Mion, PLLC

(57) ABSTRACT

The invention has for its object to provide a network in which an optimized mode of operation is made possible both in the trouble-free case and on the occurrence of a disturbance. This object is attained by a point-to-multipoint network (NET) which is characterized in that it comprises two nodes (HUB3, HUB4) which are designed as subcenters, are connected to the center (HE) via respective main trunk lines, and make the signals received from the center (HE) available on reserve lines. By activating the reserve lines only if disturbances are present on the main trunk lines, power can be saved. The occurrence of a disturbance in a main trunk line is detected autonomously by each node concerned. In this manner, the nodes can control the reception and forwarding of the signals autonomously and independently of additional control equipment, such as a central switching assembly, and the reserve line is activated only on the occurrence of a disturbance.

13 Claims, 4 Drawing Sheets

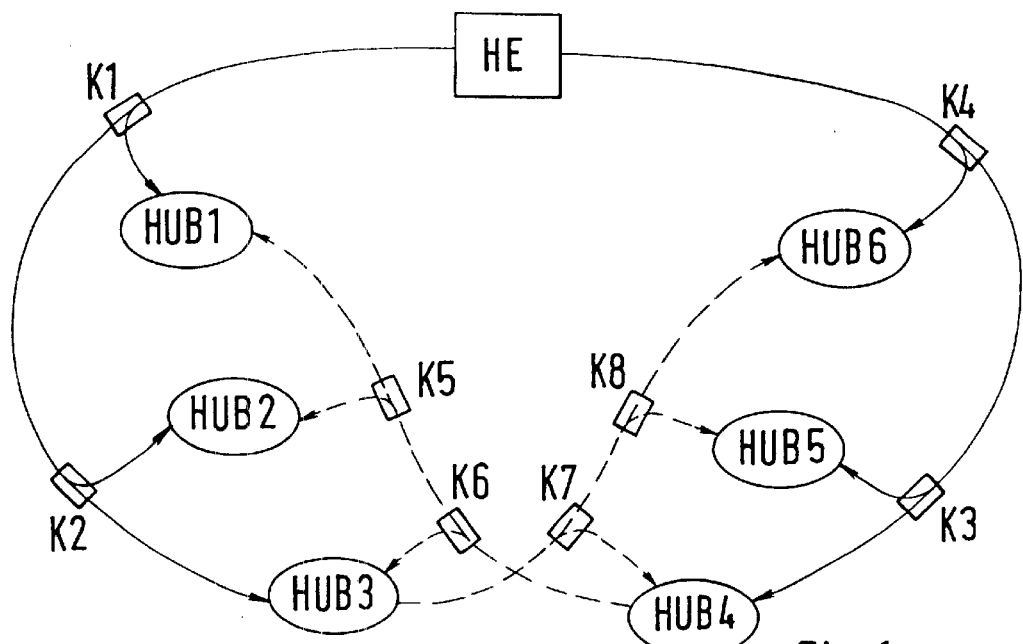
Fig.1  NET
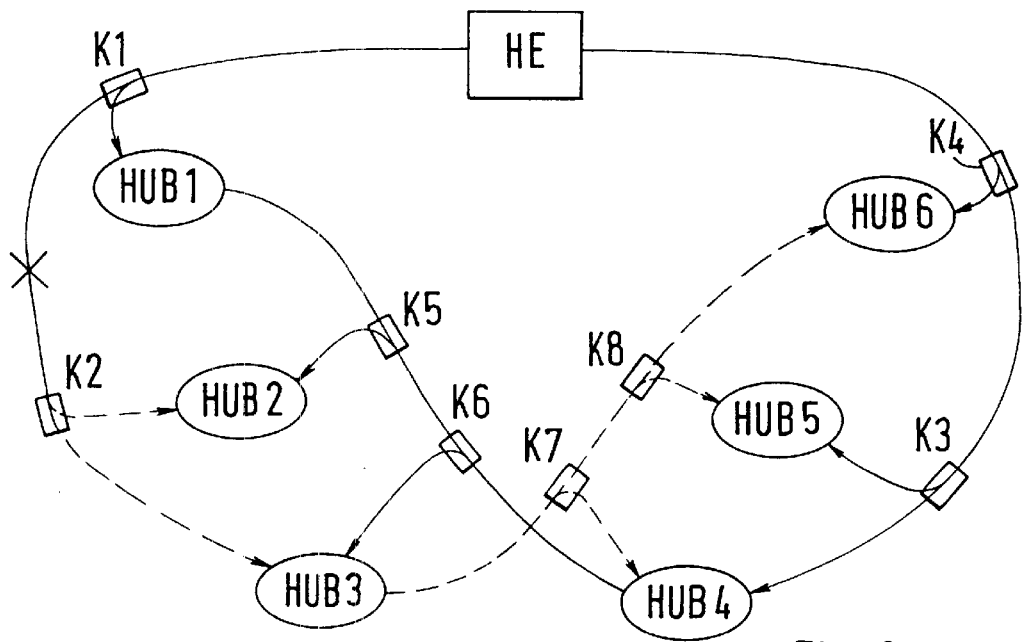
Fig.2  NET

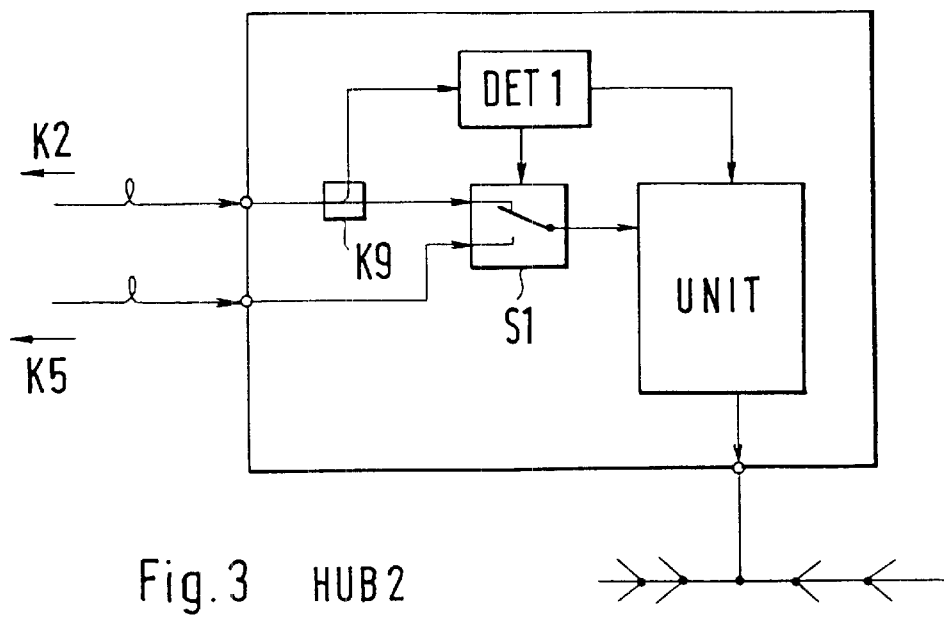
Fig. 3  HUB2
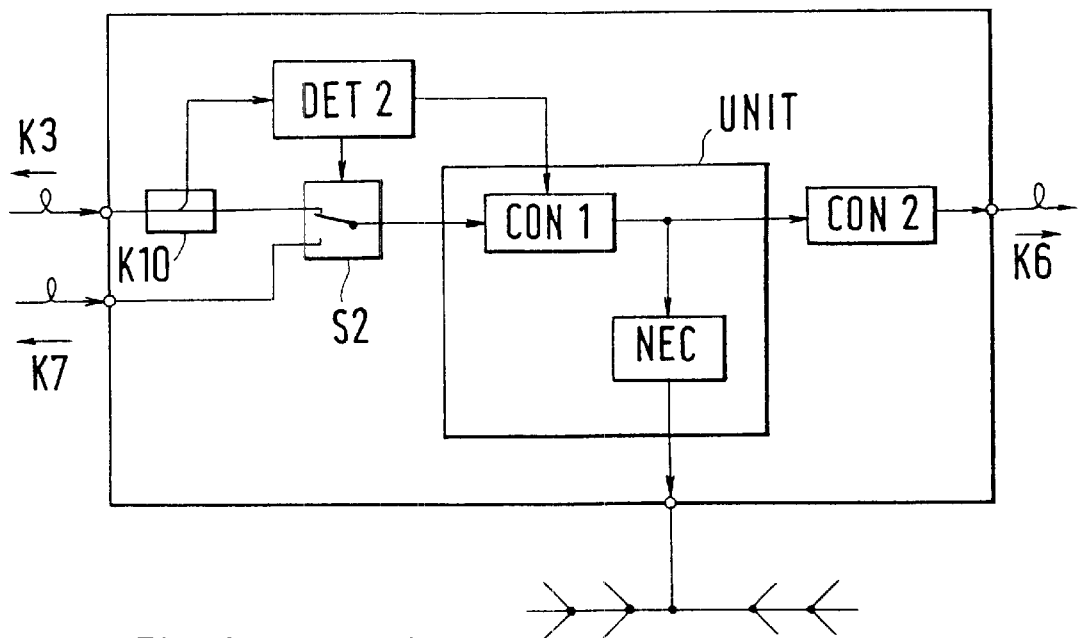
Fig. 4  HUB4

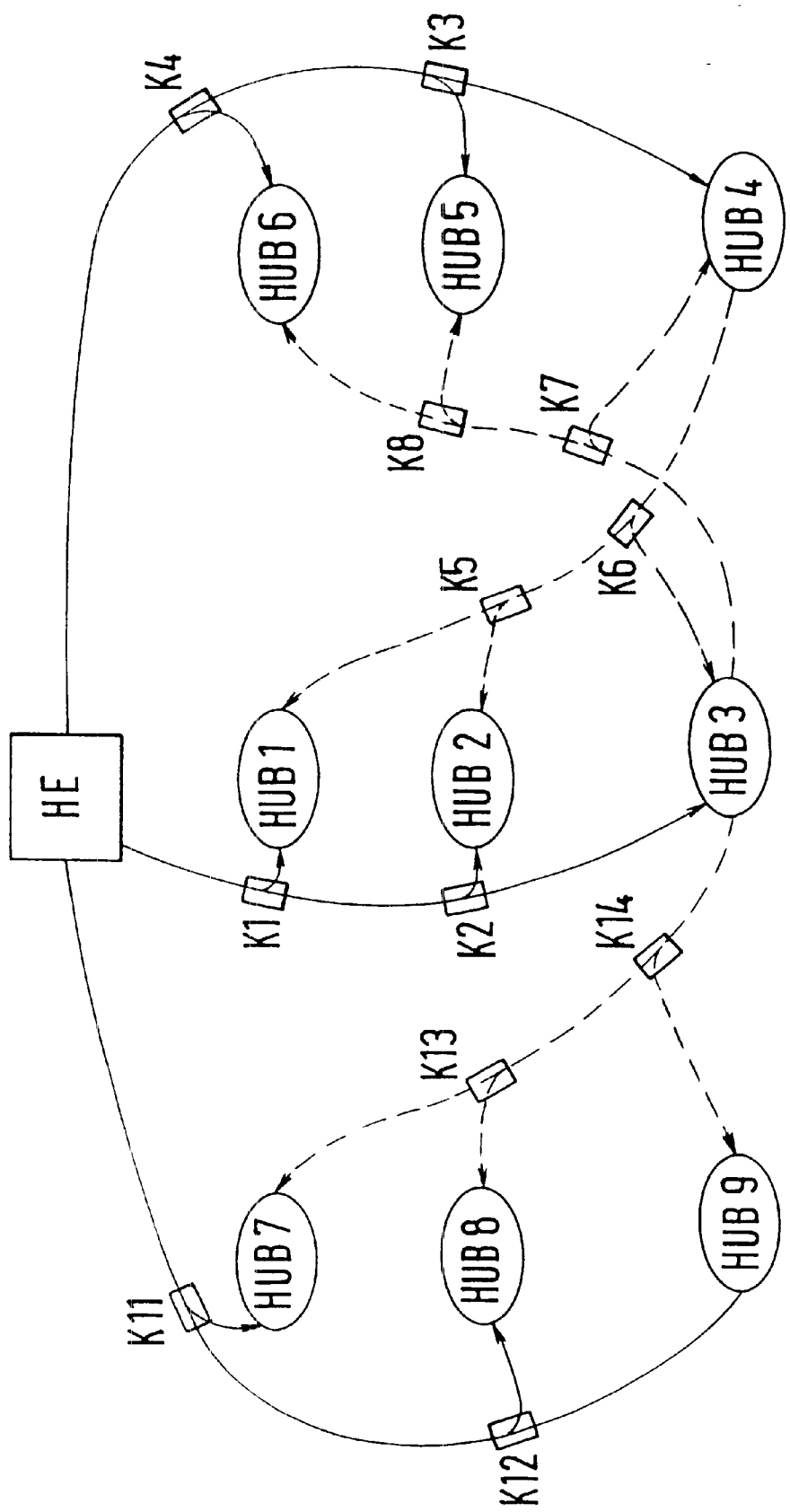
Fig. 5 NET

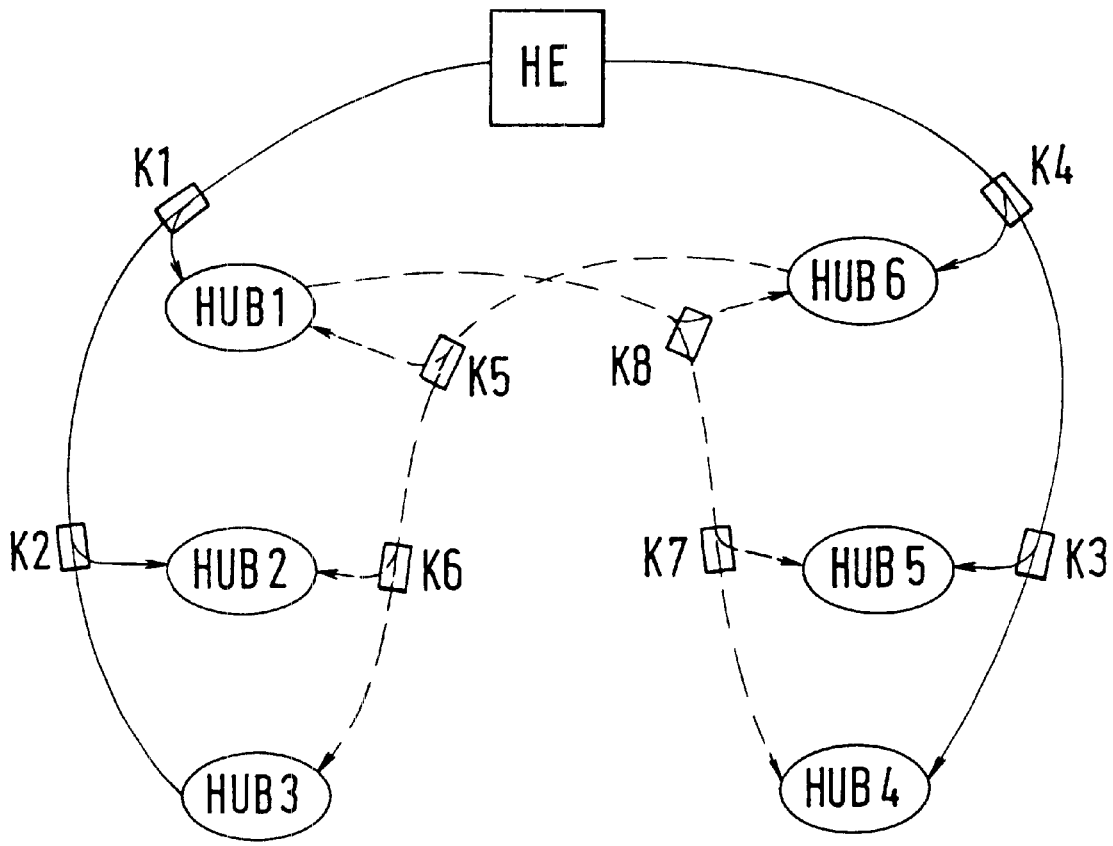
Fig. 6  NET

POINT-TO-MULTIPOINT NETWORK

BACKGROUND OF THE INVENTION

This invention relates to a point-to-multipoint network having a center transmitting signals to several nodes.

In point-to-multipoint networks, e.g. in a cable distribution network with or without reverse channel, signals, such as cable television signals and/or telephone signals ("cablephone"), are generally transmitted from a center over two separate optical fiber links to several nodes in such a way that each of the nodes receives signals from both links. Each node serves a coaxial cable network with a plurality of terminals. Such a network structure is known from the journal "telecom report" of Siemens AG, No. 3/1996, pages 10 to 13.

The separate optical fiber links are provided to ensure that in the event of a disturbance, caused, for example, by a cable break or by insufficient amplification, it is not possible for individual nodes to receive no signals or only signals of reduced quality. In each node, the incoming signals on the two links are detected by means of two detectors, and only the signal with the higher level is routed onward via a switch.

A disadvantage of such networks is that both optical fiber links must constantly be operated at a high signal level, whereby much power is wasted, which also increases the aging rate of the network.

In the network disclosed in DE 19650088, two optical fiber links connected to a center end in a switching assembly which routes signals onward only if a disturbance is detected on one of the two optical fiber links. In this manner, a reserve link is activated on the occurrence of a disturbance, so that the performance of the network can be optimized for the trouble-free case. Disadvantages are that a separate switching assembly is needed, and that in the event of a disturbance, the supply of signals to nodes depends on the proper operation of the switching assembly.

SUMMARY OF THE INVENTION

It is therefore an object of the invention to provide a network in which an optimized mode of operation is made possible both in the trouble-free case and on the occurrence of a disturbance.

This object is attained by a point-to-multipoint network according to the invention which characterized in that it comprises two nodes designed as subcenters which are connected to a center via respective main trunk lines and make the signals received from the center available on reserve lines. By activating the reserve lines only if disturbances are present on the main trunk lines, power can be saved. The occurrence of a disturbance in a main trunk line is detected autonomously by each node concerned. In this manner, the nodes can control the reception and forwarding of the signals autonomously and independently of additional control equipment, such as a central switching assembly, and the reserve line is activated only on the occurrence of a disturbance.

Futher advantages features of the invention will be apparent from the description below and the appended claims.

BRIEF DESCRIPTION OF THE DRAWINGS

Three embodiments of the invention will now be described with reference to the accompanying drawings, in which:

FIG. 1 is a schematic of a first network according to the invention;

FIG. 2 shows the network of FIG. 1 on the occurrence of a disturbance;

FIG. 3 is a schematic block diagram of a first node according to the invention for the network of FIG. 1;

FIG. 4 is a schematic block diagram of a second node according to the invention for the network of FIG. 1;

FIG. 5 is a schematic of a second network according to the invention; and

FIG. 6 is a schematic of a third network according to the invention.

DETAILED DESCRIPTION OF THE INVENTION

The first embodiment will now be explained with reference to FIGS. 1 to 4. FIG. 1 shows a network according to the invention, NET. The network NET is designed as a point-to-multipoint network and particularly as a unidirectional distribution network, for example as a network for distributing cable television signals from a center HE to a plurality of terminals (not shown in order to simplify the illustration). The network NET can be readily converted to a bidirectional network, for example by using an existing telephone network as a reverse channel, by using two different wavelengths for one and the same optical fiber link, or by using a second distribution network as a reverse channel; this also makes it possible to implement services such as cablephone, service-on-demand, video-on-demand, and/or the like. The invention can be applied to unidirectional and bidirectional networks. For the sake of simplicity, in FIG. 1 a unidirectional distribution network has been chosen with respect to the signals sent out by the center HE.

Besides the center HE, which is also referred to as a "head end", the network NET comprises six nodes HUB1, HUB2, HUB3, HUB4, HUB5, HUB6, which are also referred to as "network elements".

The center HE is suitable for transmitting signals to the six nodes HUB1, HUB2, HUB3, HUB4, HUB5, HUB6. The center HE is connected via a first main trunk line to a first node HUB3, which is designed as a subcenter and is suitable for receiving signals and routing them onward over a first reserve line. The center HE is also connected via a second main trunk line to a second node HUB4, which is designed as a subcenter and is suitable for receiving signals and routing them onward over a second reserve line. The first reserve line serves as a reserve line for the second main trunk, and the second reserve line serves as a reserve line for the first main trunk. Each of the six nodes HUB1, HUB2, HUB3, HUB4, HUB5, HUB6 is connected to one of the two main trunk lines and the associated reserve line.

Signals, e.g. cable television signals, are transmitted from the center HE to the nodes HUB1, HUB2, HUB3, HUB4, HUB5, HUB6 over two different paths, with two main trunk lines and two reserve lines being provided, namely one main trunk line and one reserve line for the three nodes HUB1, HUB2, HUB3, and one main trunk line and one reserve line for the three nodes HUB4, HUB5, HUB6. The three nodes HUB1, HUB2, HUB3 are supplied with signals from the center HE over the first main trunk line. The first main trunk line is represented by continuous lines. The three nodes HUB4, HUB5, HUB6 are supplied with signals from the center HE over the second main trunk line. The second main trunk line is also represented by continuous lines. The three nodes HUB4, HUB5, HUB6 are supplied with signals from the node HUB3 over the first reserve line if a disturbance occurs on the second main trunk line. The first reserve line is indicated by dashed lines. The three nodes HUB1, HUB2, HUB3 are supplied with signals from node HUB4 over the second reserve line if a disturbance occurs on the first main trunk line. The second reserve line is also indicated by dashed lines.

Connected to each of the nodes HUB1, HUB2, HUB3, HUB4, HUB5, HUB6 is a coaxial cable network (not shown for simplicity) for distributing the cable television signals to a plurality of terminals.

The two main trunk lines and the two reserve lines are implemented as optical fiber links. The optical fiber links contain optical coupling devices K1, K2, K3, K4, K5, K6, K7, K8, via which the six nodes HUB1, HUB2, HUB3, HUB4, HUB5, HUB6 are connected to one of the two main trunk lines and the associated reserve line. The coupling devices are, for example, optical splitters, e.g., 2×2 splitters, or optical couplers, e.g., 2×2 couplers. By means of the coupling device, signals of an optical fiber link are duplicated, for example, and transferred to two different optical fiber links. Through the use of asymmetrical coupling devices, 30% of the level of a signal, for example, can be fed to a node and 70% of the signal level to the next coupling device. In this manner, all nodes HUB1, HUB2, HUB3, HUB4, HUB5, HUB6 receive signals with approximately the same level.

The first main trunk line contains the coupling devices K1 and K2. Coupling device K1 taps off signals for node HUB1, and coupling device K2 taps off signals for node HUB2. The second main trunk line contains the coupling devices K3 and K4. Coupling device K3 taps off signals for node HUB5, and coupling device K4 taps off signals for node HUB6. The first reserve line contains the coupling devices K7 and K8. Coupling device K7 taps off signals for node HUB4, and coupling device K8 taps off signals for node HUB5. The second reserve line contains the coupling devices K5 and K6. Coupling device K5 taps off signals for node HUB2, and coupling device K6 taps off signals for node HUB3.

FIG. 2 shows the network of FIG. 1 on the occurrence of a disturbance on the first main trunk line between coupling device K1 and coupling device K2. Because of the disturbance, which is caused by a cable break, for example, signals can no longer be routed to nodes HUB2 and HUB3 over the first main trunk line. Node HUB2 detects that it is receiving no signals or signals of insufficient quality, and switches over to receive signals from node HUB4 over the second reserve line. Similarly, node HUB3 detects that it is receiving no signals or signals of insufficient quality, and switches over to receive signals from node HUB4 over the second reserve line. Node HUB1 thus continues to be supplied with signals from the center HE directly over the first main trunk line, while nodes HUB2, HUB3, HUB4, HUB5, HUB6 receive the signals from the center HE over the second main trunk line and over the second reserve line, this being indicated in FIG. 2 by continuous lines.

FIG. 3 shows a first node according to the invention for the network of FIG. 1. The node shown is HUB2. The construction and operation of the nodes HUB1, HUB5, HUB6 is comparable to that of HUB2.

The node HUB2 contains a conversion unit UNIT, a detector DET1 for monitoring the signals received via the first main trunk line and the coupling device K2, and a switch S1, which is controlled by the detector DET1. The detector DET1 controls the switch S1 in such a way that, if the signals received over the first main trunk line are undisturbed, the switch S1 will route the signals received over the first main trunk line to the conversion unit UNIT, and that, if the signals received over the first main trunk line are disturbed, the switch S1 will route the signals received over the second reserve line to the conversion unit UNIT.

The detector DET1 contains, for example, and optical-to-electrical converter, such as a photodiode, followed by a threshold detector or a comparator. The detector DET1 determines whether the level of the signals received via the first main trunk line and the coupling device K2 is high enough to supply, for example, all terminals of the subsequent coaxial cable network. If that is the case, reception is undisturbed and the switch S1 will be controlled by the detector DET1 to route the signals received via the first main trunk line and the coupling device K2 to the conversion unit UNIT. If the level of the signals received via the main trunk line and the coupling device K2 is below the predetermined threshold, reception is affected by a disturbance and the switch S1 will be controlled by the detector DET1 to route the signals received via the second reserve line and the coupling device K5 to the conversion unit UNIT. If the level of the signals received via the first main trunk line and the coupling device K2 rises above the predetermined threshold again at a later time, the switch Si will be switched back.

The detector DET1 has one input and two outputs. The node HUB2 includes a coupling device K9 which is inserted in the first main trunk line in such a way as to tap off a part of the received signals, for example 10% of the signal level, and apply it to the input of the detector DET1. One of the two outputs of the detector DET1 is connected to the control input of the switch S1, and the other is connected to the conversion unit UNIT. The connection between detector DET1 and conversion unit UNIT serves to notify the converter UNIT when a disturbance is present on the first main trunk line, so that the conversion unit UNIT can take further steps, for example transmit a request or interrupt signal.

The switch S1 is implemented as an optical switch, such as an electrically controlled optical Mach-Zehnder interferometer. The switch S1 has two signal inputs, one control input, and one output. One of the signal inputs is connected via the coupling device K9 to the first main trunk line, and the other is connected to the second reserve line. The output is coupled to the conversion unit UNIT.

The conversion unit UNIT incorporates an optical-to-electrical converter for converting the received optical signals to electric ones and then transmitting the electric signals over the coaxial cable network. The conversion network UNIT may additionally include an amplifier, a protocol adapter, filters, equalizers, etc.

The conversion unit UNIT further comprises a transmitting device for transmitting a request signal over the second reserve line. During undisturbed reception, forwarding over the second reserve line of the signals received from the center HE is suppressed by the node HUB4 in order to save power. Instead of the signals received from the center, no signal or polling signals, for example, are sent out by the node HUB4 over the second reserve line. The polling signals are, for example, bursts with a particular identification which are received by, among others, the node HUB2. In the absence of a disturbance, the node HUB2 sends to the node HUB4, for example, no signal or a reply signal with the information: forwarding of the signals sent out by the center HE not necessary. After detection of a disturbance, node HUB2 sends the request signal to node HUB4. The request signal contains the information: forwarding of the signals sent out by the center HE requested. Node HUB4 receives the request signal and, in response thereto, activates the second reserve line, i.e., it routes the signals received from the center onward HE over the second reserve line to node HUB2, so that the latter can receive signals from the center HE even if the first main trunk line is affected by a disturbance.

The conversion unit UNIT further includes a transmitting device for transmitting an interrupt signal over the second reserve line. The interrupt signal contains the information: forwarding of the signals transmitted by the center no longer necessary. The node HUB4 receives the interrupt signal and, in response thereto, deactivates the second reserve line, i.e., it no longer routes the signals coming from the center onward over the second reserve line to the node HUB2.

The second reserve line is designed for bidirectional operation so as to permit nodes HUB1, HUB2, HUB3 to communicate with node HUB4. In addition, both main trunk lines and/or the two reserve lines may be designed for bidirectional operation. The bidirectional operation of the first reserve line enables nodes HUB4, HUB5, HUB6 to communicate with node HUB3. The bidirectional operation of the main trunk line may serve to notify the center HE that one of the two nodes HUB3, HUB4 is routing the signals received from the center HE onward. The center HE can then transmit the signals at a higher level, so that even the nodes located farthest from the center HE during transmission over the reserve lines, i.e., the nodes HUB1 and HUB6, will be supplied with a sufficient signal level. The center HE can also be informed that a fault has occurred in the network, and can then locate the fault by interrogating the nodes connected to the faulty main trunk line. The fault lies between those nodes which respond to the center HE and those which do not respond to the center HE. The fault has thus been located and measures can be taken to clear it, for example by sending a repair person to the location of the fault. For this purpose, the conversion unit UNIT includes, for example, a transmitting device for transmitting a reply signal over the first main trunk line.

FIG. 4 shows a second node according to the invention for the network of FIG. 1. The node shown is HUB4. The construction and operation of the node HUB4 is comparable to that of HUB3.

The node HUB4 comprises a conversion unit UNIT, a detector DET2 for monitoring the signals received over the second main trunk line, and a switch S2, which is controllable via the detector DET2. The detector DET2 controls the switch S2 in such a way that, if the signals received over the second main trunk line are undisturbed, the switch S2 will route them to the conversion unit UNIT, and that, if the signals received over the second main trunk line are disturbed, the switch S2 will route the signals received over the first reserve line to the conversion unit UNIT.

The node HUB4 further includes a transmitter/receiver module implemented as a concentrator CON2 which is designed to route the signals received over the second main trunk line onward over the second reserve line only after receipt of a request signal. (Similarly, node HUB3 includes a transmitter/receiver module which is designed to route the signals received over the first main trunk line onward over the first reserve line only after receipt of a request signal).

The transmitter/receiver module of the node HUB4 is so designed that after receipt of an interrupt signal, it interrupts the retransmission over the second reserve line of the signals received over the second main trunk line.

For explanations regarding the transmission of the request and interrupt signals, reference is made to the description of FIG. 3.

The conversion unit UNIT contains a concentrator CON1 and a network element controller NEC. The concentrator CON1 contains an optical-to-electrical converter for converting the received optical signals to electric ones and then feeding the electric signals to the network elements controller NEC. In addition, the concentrator CON1 may include a protocol converter for converting the received signals to a predetermined format. The network element controller NEC serves to electrically process the received signals, for example to perform protocol adaptation and amplify the signals, and to subsequently transmit them over the associated coaxial cable network.

The concentrator CON2 receives the output signals from the concentrator CON1. The concentrator CON2 has an electrical-to-optical converter for converting the signals received from the concentrator CON1 to optical ones and subsequently transmitting them over the first reserve line if the first main trunk line is affected by a disturbance. By means of an electrical or optical amplifier or regenerator, the signals to be transmitted can be amplified or regenerated. The concentrator CON2 further includes an optical-to-electrical converter for receiving the request and interrupt signals from the nodes HUB1, HUB2, HUB3 and converting them to electric signals, which are then fed to an evaluator, e.g. a processor.

The second embodiment will now be explained with reference to FIG. 5. FIG. 5 shows a further network according to the invention, NET. The network NET is designed as a point-to-multipoint network and is similar in structure and operation to the network of FIG. 1, with the difference that the center HE is additionally connected via a third main trunk line to three further nodes HUB7, HUB8, HUB9, and that a third reserve line serves as the reserve line for the three further nodes HUB7, HUB8, HUB9, with node HUB3 or node HUB4 being suitable for routing the signals received from the center HE onward over the third reserve line. Instead of the third reserve line, the first or second reserve line can be used as the reserve line for the at least one further node HUB7, HUB8, HUB9 by extracting a part of the signal level from the respective reserve line via a further coupling device and feeding it to the three nodes HUB7, HUB8, HUB9. This has the advantage that only one node, which is designed as a subcenter, is needed for two reserve lines.

The third embodiment will now be explained with reference to FIG. 6. FIG. 6 shows a further network according to the invention, NET. The network NET is designed as a point-to-multipoint network and is similar in structure and operation to the network of FIG. 1, with the difference that instead of the nodes HUB3, HUB4, the nodes HUB1, HUB2 are designed as subcenters. This has the advantage that fewer cables are needed for a network extension, because the addition of a further node after node HUB3, for example, requires only one coupling device between coupling device K2 and node HUB3, one coupling device between coupling device K6 and node HUB3, and the connections from these two new coupling devices to the further node. By contrast, in the network of FIG. 1, a coupling device between coupling device K6 and node HUB3 would result in two coupling devices being cascaded, which would have negative effects on the signal level distribution.

In all three embodiments, the main trunk lines and reserve lines should be laid in such a way that shorter distances can be realized between the center HE and the nodes for the trouble-free case, i.e., that the main trunk lines are shorter than the reserve lines, for shorter distances make it possible to implement higher signal levels because of the lower attenuation losses, or to save power at unchanged signal levels.

What is claimed is:

1. A point-to-multipoint network (NET) comprising a center (HE) suitable for transmitting signals to several nodes, wherein the center (HE) is connected via a first main trunk line to a first node designed as a subcenter and suitable for receiving signals and routing them onward over a first reserve line, and the center (HE) is connected via a second main trunk line to a second node designed as a subcenter and suitable for receiving signals and routing them onward over a second reserve line, the first reserve line serving as a reserve line for the second main trunk line, and the second reserve line serving as a reserve line for the first main trunk line, and each of the several nodes being connected to one of the two main trunk lines and to the associated reserve line.

2. A point-to-multipoint network (NET) as claimed in claim 1, characterized in that the two main trunk lines and the two reserve lines are implemented as optical fiber links, and that the optical fiber links contain optical coupling devices (K1, K2, K3, K4, K5, K6, K7, K8) via which the several nodes (HUB1, HUB2, HUB3, HUB4, HUB5, HUB6) are connected to one of the two main trunk lines and the associated reserve line.

3. A point-to-multipoint network (NET) as claimed in claim 1, characterized in that the two main trunk lines and/or the two reserve lines are designed for bidirectional operation.

4. A point-to-multipoint network (NET) as claimed in claim 1, characterized in that each of the several nodes (HUB1, HUB2, HUB3, HUB4, HUB5, HUB6) comprises a conversion unit (UNIT), a detector (DET1) for monitoring the signals received over the associated main trunk line, and a switch (S1) controllable via the detector (DET1), and that the detector (DET1) controls the switch (S1) in such a way that, if the signals received over the associated main trunk line are undisturbed, the switch (S1) will route the signals received over the associated main trunk line to the conversion unit (UNIT), and that, if the signals received over the associated main trunk line are disturbed, the switch (S1) will route the signals received over the associated reserve line to the conversion unit (UNIT).

5. A point-to-multipoint network (NET) as claimed in claim 4, characterized in that the conversion unit (UNIT) contains a transmitting device for transmitting request signals over the associated reserve line.

6. A point-to-multipoint network (NET) as claimed in claim 5, characterized in that the conversion unit (UNIT) contains a transmitting device for transmitting interrupt signals over the associated reserve line.

7. A point-to-multipoint network (NET) as claimed in claim 1, wherein the first and second nodes each contain a conversion unit (UNIT), a detector (DET2) for monitoring the signals received over the associated main trunk line, and a switch (S2) controllable via the detector (DET2), and that the detector (DET2) controls the switch (S2) in such a way that, if the signals received over the associated main trunk line are undisturbed, the switch (S2) will route the signals received over the associated main trunk line to the conversion unit (UNIT), and that, if the signals received over the associated main trunk line are disturbed, the switch (S2) will route the signals received over the associated reserve line to the conversion unit (UNIT).

8. A point-to-multipoint network (NET) as claimed in claim 7, wherein the first node further comprises a transmitter/receiver module which is designed to route the signals received over the first main trunk line onward over the first reserve line only after receipt of a request signal, and that the second node further comprises a transmitter/receiver module which is designed to route the signals received over the second main trunk line onward over the second reserve line only after receipt of a request signal.

9. A point-to-multipoint network (NET) as claimed in claim 8, wherein the transmitter/receiver module of the first node is so designed that after receipt of an interrupt signal, it interrupts the forwarding over the first reserve line of the signals received over the first main trunk line, and that the transmitter/receiver module of the second node is so designed that after receipt of an interrupt signal, it interrupts the forwarding over the second reserve line of the signals received over the second main trunk line.

10. A point-to-multipoint network (NET) as claimed in claim 1, characterized in that the center (HE) is connected via a third main trunk line to at least one further node (HUB7, HUB8, HUB9), and that the first reserve line serves as a reserve line for the at least one further node (HUB7, HUB8, HB9).

11. A point-to-multipoint network (NET) as claimed in claim 1, wherein the center (HE) is connected via a third main trunk line to at least one further node, and that a third reserve line serves as a reserve line for the at least one further node, with the first node being suitable for routing the signals received from the center (HE) onward over the third reserve line.

12. A point-to-multipoint network (NET) as claimed in claim 1, wherein each of the several nodes comprises a conversion unit (UNIT), a detector (DET1) for monitoring the signals received over the associated main trunk line, and a switch (S1), wherein if the signals received over the associated main trunk line are undisturbed, the switch (S1) will route the signals received over the associated main trunk line to the conversion unit (UNIT), and, if the signals received over the associated main trunk line are disturbed, the switch (S1) will route the signals received over the associated reserve line to the conversion unit (UNIT).

13. A point-to-multipoint network (NET) as claimed in claim 1, wherein the first and second nodes each contain a conversion unit (UNIT), a detector (DET2) for monitoring the signals received over the associated main trunk line, and a switch (S2), wherein if the signals received over the associated main trunk line are undisturbed, the switch (S2) will route the signals received over the associated main trunk line to the conversion unit (UNIT), and, if the signals received over the associated main trunk line are disturbed, the switch (S2) will route the signals received over the associated reserve line to the conversion unit (UNIT).

* * * * *